United States Patent

[11] 3,595,387

| | | | |
|---|---|---|---|
| [72] | Inventor | Jacob H. Mosterd |  |
| | | Stationweg 117, Barneveld, Netherlands | |
| [21] | Appl. No. | 809,338 | |
| [22] | Filed | Mar. 21, 1969 | |
| [45] | Patented | July 27, 1971 | |
| [32] | Priority | Mar. 22, 1968 | |
| [33] | | Netherlands | |
| [31] | | 68.04154 | |

[54] SORTING MACHINE
6 Claims, 4 Drawing Figs.

[52] U.S. Cl. .................................................. 209/74 R,
198/38, 209/121
[51] Int. Cl. .................................................. B07c 3/06
[50] Field of Search .......................................... 209/121,
74; 198/38

[56] References Cited
UNITED STATES PATENTS

| 1,538,122 | 5/1925 | Kurtz | 209/121 |
| 2,138,475 | 11/1938 | Hilton | 209/121 |

*Primary Examiner*—Richard A. Schacher
*Attorney*—William J. Daniel

ABSTRACT: A weight-sorting machine is described with guides, which support stop members for engaging discharge control means of moving weighing devices, which guides are adjustable into at least two predetermined positions, in one of which the stop members can engage the discharge control means and not so in the other position. Preferably the guides of different discharge stations are coupled for simultaneously adjusting the guides of the stations.

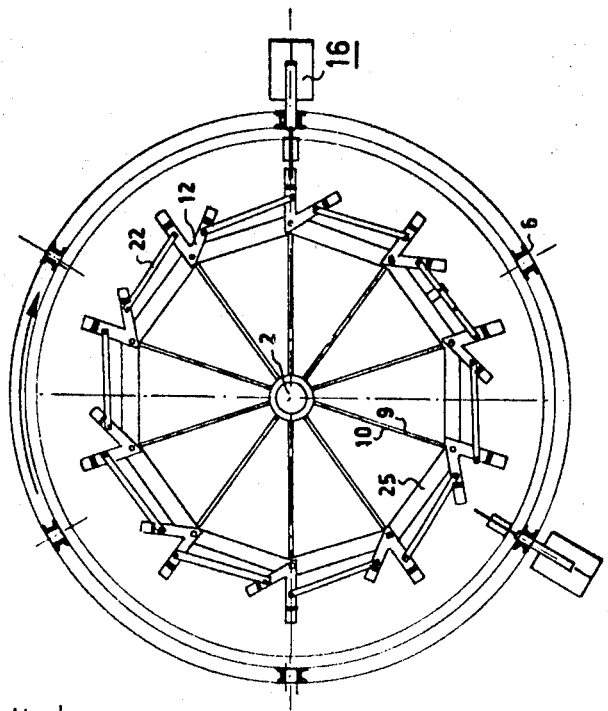
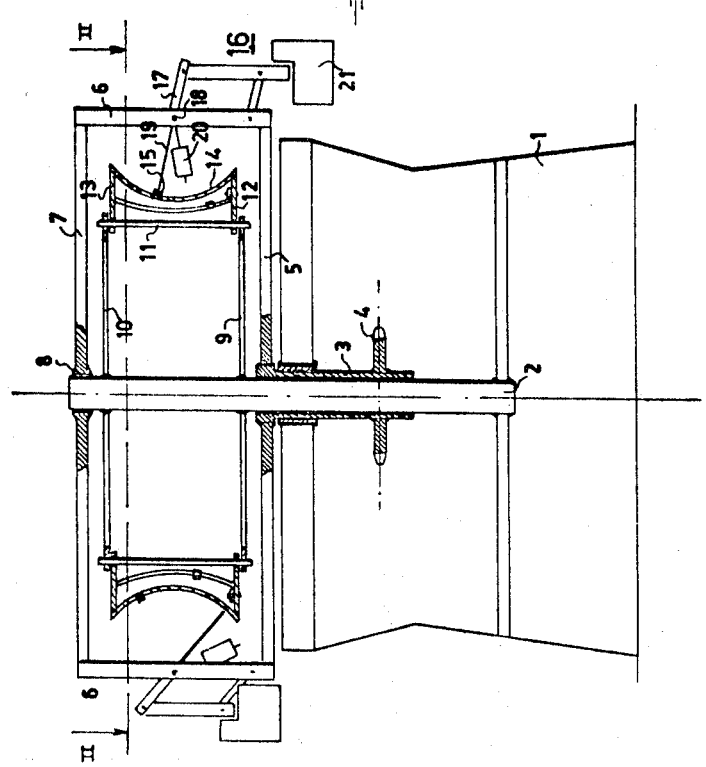
FIG. 2
FIG. 1

SORTING MACHINE

The invention relates to a machine for sorting objects according to weight, which is provided with a driven conveying member or carriage supporting for movement along a given path one or more weighing stations for receiving an object, said weighing stations each having a movable indicator member, the position of which is dependent on the weight of an object present in the weighing station, as well as a discharging mechanism for removing the object from the weighing station, said machine being further provided with stationary detector elements positioned along the path of the weighing stations for operating the discharging mechanism of a weighing station carrying an object of a predetermined indicated weight, said stationary detector elements being adjustably mounted on guides to permit variation in the predetermined discharge weight.

Such sorting machines are known in practice. The invention aims at providing a simple construction, making possible easy adjustment in the position of the stop members in accordance with a desired sorting program.

Accordingly, the invention provides detector elements which are movable between at least two positions, the first position of which is an operative position where the detector elements are disposed adjacent the path of the weighing stations in cooperative working relation to the indicator elements thereof and in the second position of which they are spaced from this path in inoperative position.

In this way, it is possible to bring the detector elements of the detector stations selectively into and out of working position. When an element has been in the inoperative position and then again is brought into its working position, it is effective without further adjustment to cause discharge of objects of an initially predetermined weight. A further advantage of the selective control of the detector elements arises when the volume of objects discharged from a predetermined weighing station is either too small or is considerably too large. In practice it repeatedly occurs, that a large percentage of a certain batch of objects to be sorted falls in the same category weight. In that case the output of the station corresponding to the category soon is overloaded. By bringing then the detector element of this location into the nonworking position and bringing an element of an other sorting station adjusted to detect objects in the same class of weight into the working position, it is possible for the objects of this class of weight to be delivered to said other station until the output from the first station has been cleared up. In practice the present invention enables the capacity of a certain machine with a given complement of operating personnel to be considerably increased, the more so as the change of the detector elements can take place very quickly.

Another difficulty, which can occur, is that the entire machine has to be changed over to a different range of weight. This occurs, e.g., but not exclusively, when sorting fish, with which the ranges of weight must be completely differently adjusted for sorting various kinds of fish, like e.g. sole and flounder. Said changing over of the sorting range can be obtained according to a further embodiment of the invention, in that at each detector station more than one detector element are present and the elements at each station have been coupled with each other and with the elements of at least a certain group of other stations so that by selecting different positions for a common control mechanism different sets of guides may be brought into working position.

Thus not only a quick changing over is obtained, but also, the capacity to return to a previous range of weight without the necessity for recalibrating the detector elements.

Although there exist many possibilities of coupling the detector elements of the various detecting stations, it has appeared in practice, that a cheap and completely satisfactory construction can be obtained by supporting the detector elements on guide means on which each element can be positioned in advance to respond to a given weight of objects as indicated by the indicating means on each weighing station with the guide means of every station being mounted on a pivotable support and said supports being coupled with each other. Said coupling can take place in a variety of ways, e.g., by means of coupling rods; by means of pinions, which are operated by a joint rack; etc.

The invention is in the following description is further explained, particularly in reference to the accompanying drawing, in which:

FIG. 1 is a view, partly in section, of a machine according to the invention;

FIG. 2 shows a section along the line II–II of FIG. 1;

Figure 3:
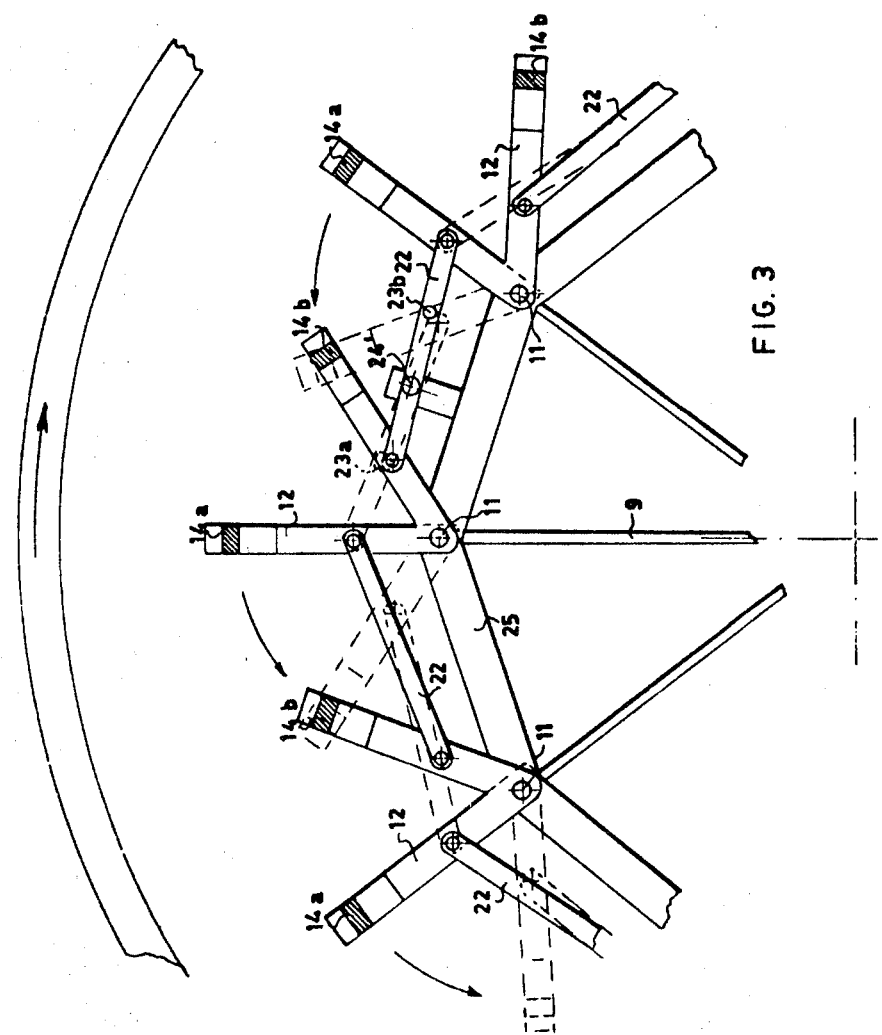
FIG. 3 shows a detail on a larger scale.

In FIG. 1 a frame has been indicated at 1, in which a stationary axis 2 has been mounted, on which by means of bearings (not shown) a hub 3 has been mounted bearing a gearwheel 4, said gearwheel being coupled with a driving means (not shown), e.g. a chain-drive or a further gearwheel, by which hub 3 can be brought into slow rotation. On hub 3 there has further been attached a rotatable plate 5 with brackets 6, which at their upper sides bear a further plate 7, which by means of a bearing 8 can rotate on the stationary axis 2.

The stationary axis 2 further bears a number of spokes 9 and 10. The ends of the spokes 9 have been interconnected by a decagonal frame ring 25. In said ring 25 and a corresponding ring, connecting the ends of the spokes 10 shafts 11 are supported. Pivotally arranged at each of the upper and lower ends of each shaft is a V-shaped support member 12 and 13, the pivot axis passing through the base of the V. The legs of the V-shaped support members project generally outwardly from axis 2 and between the corresponding upper and lower legs extend arc-shaped guides 14, each of which adjustably bear a detector member 15 at any predetermined point on the arc or length thereof.

To the brackets 6 weighing stations 16 have been attached, which mainly consist of a weighing beam 17 which is pivotable about a pivot 18, with which the lengthened portion of the weighing beam 17 forms an indicator member 19. Each weighing device is further provided with a usual counter-weight 20, a parallelogram coupling and a discharging mechanism (not further indicated) by which the container 21 mounted at its lower side can be manipulated to remove the object being weighed. The discharge mechanism is actuated by means not shown when the position of the indicator member 19 coincides with that of a detector member 15. In one embodiment, the detector members are physically engaged or contacted by the indicator members when the position of the end of the indicator member as determined by the weight of the object at that station coincides or is in registration with the position at which the detector member has been placed on its guide 14.

In the top view of FIG. 2 only two of these weighing stations have been shown. Furthermore it has been indicated in this figure, that the V-shaped pivot members 12, 13 have been coupled with each other by means of coupling rods 22. One of these coupling rods has been connected with a latching mechanism. Said latching mechanism and the coupling of the various V-shaped pivot members have more clearly been indicated in FIG. 3. As appears from this figure a pair of the guides designated 14a, 14b, respectively, have been mounted on every pair of pivot members 12 and 13. In the position shown in FIG. 3 the guides 14a protrude further radially outwardly than the guides 14b, by which it is obtained, that the detector members present on the guides 14a can cooperate with an indicator member 19 of the weighing station, while a detector member mounted on a guide 14b remains outside the path of such an indicator member.

The coupling rods 22 always connect a leg of a V-shaped pivot member belonging to a guide 14a with a leg of the preceding pivot member belonging to a guide 14b. One of the coupling rods 22 is provided with two pinholes 23a and 23b, a latching post provided with a pinhole 24 being attached to the frame ring 25.

When guides 14a are positioned in the path of the abutment members 19 the holes 23a and 24 coincide and this working position can be fixed by a pin 24' protruding into holes 23a and 24. In the working position of the guides 14b the pinholes 23b and 24 are interconnected in the same way.

When the machine is in operation, objects are supplied to the weighing stations at a predetermined location and the frame 5, 6, 7 is pivoted via the gearwheel 4. When an indicator members 19 engages a detector member at a given detecting station, the weighing device 21 is opened at the location of that station, and the object is delivered. When it is necessary to change over now to weight objects in a different range of weight, pin 24' is removed and the pivot members 12 and 13 are pivoted until the detector members of the other pair of guides come into the path of the new set of indicator members 19, which has been adjusted in advance along their guides according to the new range of weights.

In the shown embodiment only two guides 14 are present per detecting location. It will be clear, however, that it is possible to extend this number considerably in dependence on the needs of a given situation.

Figure 4:
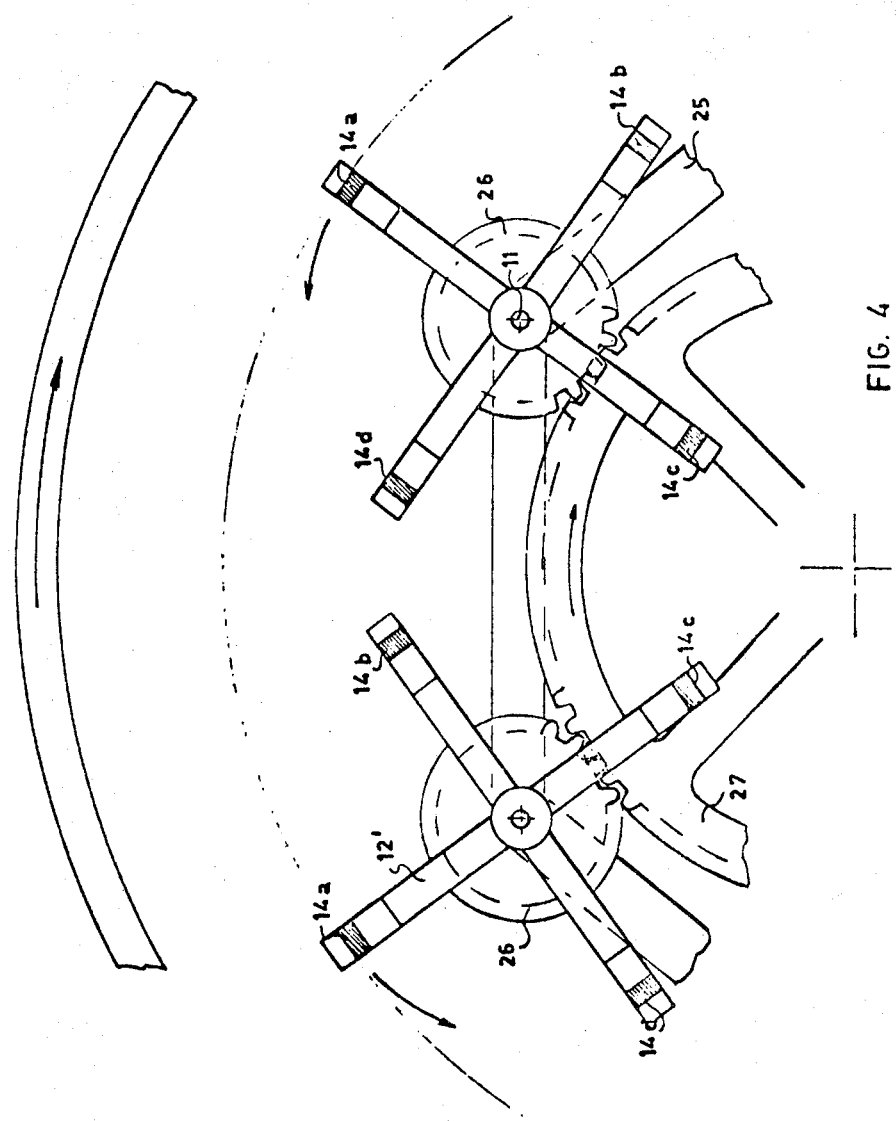
FIG. 4 shows a detail corresponding with FIG. 3 of another embodiment.

An example hereof has schematically illustrated in FIG. 4. In this figure the shafts 11 have fixedly been connected with pinions 26, which mesh with the teeth of a large gearwheel 27. A cross or V-shaped support 12', 13' is attached to each shaft 11 each of its upper and lower side, and between the ends of the arms of these supports four guides 14a, 14b, 14c, 14d respectively have been mounted. In FIG. 4 the guides 14a are in the working position. By pivoting the wheel 27 cross-shaped supports 12', 13' in the direction of the arrow drawn therein until the cross-shaped supports 12', 13' have pivoted a quarter of a revolution, the guides 14b are brought into the working position. It will be clear, that this construction can easily be adapted to more than four guides per detecting station, e.g. six guides, by replacing the supports 12' by six armed-supports which mutually enclose angles of 60° and to mount guides, like 14a—d, at the ends of these arms.

It will be clear that, especially with relatively large machines, it is not always necessary, for the gearwheel 27 to be provided with teeth over its complete periphery. A cheap solution than consists in mounting teeth segments on a wheel, which segments advantageously can be made from synthetic materials.

It can be advantageous to be able to render predetermined detecting locations inoperative by deactivating certain guides but without disturbing the predetermined location of the detector members on the guides. This can e.g. take place by pivotably mounting the guide supports at one end, e.g. the upper end, for movement in a radial plane through the shafts 11 and to make the lower supports detachable. Thus, after the lower support has been detached, the guide assembly can be swung downwardly and inwardly and then are retained with means suitable therefore.

Moreover a machine has been shown in the drawing, in which the weighing stations 16 are arranged in a circular path, this is, however, not necessary to the practice of the invention. Sorting machines having the weighing stations arranged in a straight line path adjacent the detecting locations e.g. can be improved by means of the invention. The way in which the various guides have been coupled with each other can also be changed in many ways, without falling outside the scope of the invention. It is of interest indeed that the movability of the guides is such, that when they have again been brought into the working position, the indicator members 19 thereon automatically are in their original working position without further adjustment. Even when the pivot members 12 and 13 are not pivoted exactly into their ideal position the detector members present on the corresponding guides nevertheless come into the path of the indicator members 19, since the height-position of these detector members is independent of the radial position of their supports.

It is also possible to provide at each station a number of guides situated in closely spaced relation which guides could be coupled or not or mounted pivotably or not. As before, the guides would be selectively activated one by one at each position. This, in many cases, gives a simple construction, but can have the disadvantage, that the position of the detector means necessarily changes somewhat with a change in the detector member in operative position. For some applications, like sorting fish or cucumbers, this is not a disadvantage at all, but for other applications, like sorting eggs, which have to be discharged precisely into the carton, this is a disadvantage indeed and then a construction is preferred of the type shown in the drawing.

The guides have been indicated arc-shaped. It will be clear that they preferably must have a shape which conforms to the path of movement of the end of the indicator members 19, which path is described by these portions owing to a variation of weight-loading of the weighing stations. The adjustment of a detector member can, of course, be effected simply by shifting it along the length, i.e., height of a guide until the desired position corresponding to the weight for that station is reached, and then fixing it on the guide, as by means of a set screw or the like.

I claim:

1. Machine for sorting objects according to weight comprising a driven carriage carrying at least one weighing station along a predetermined path, each such weighing station having a support depending from said carriage for receiving an object, discharge means operable to remove the object from said support, and indicating means associated with each such support for bodily movement therewith along said predetermined path, said indicator means being also movable relative to said support along an independent predetermined path extending generally transversely of said carriage path, the extent of such movement of said indicator means being determined by the object weight, and a plurality of weight-detecting stations disposed adjacent said carriage path at spaced fixed points therealong, each such detecting station including a detector element having an operative position proximate said path and adapted to be adjusted to a predetermined location along a path transverse to said carriage path generally corresponding to the independent path of said indicator means, said detector element being effective when the indicator means for a given weighing station has a position along its independent path generally coinciding with the predetermined location of said element to operate the discharging means for such station, and means for moving each said element to an inoperative position away from said carriage path without alerting the adjustment predetermined position thereof.

2. The machine according to claim 1, wherein each said detecting station includes guide means for supporting the detector element for adjustment along said path and at least some of said plurality of detecting stations having their guide means coupled together whereby said coupled guide means are movable in common to move the detector elements supported thereby to said inoperative positions.

3. The machine according to claim 2, wherein each of said detector stations includes at least two detector elements each having its own guide, the guides at each station being integrally connnected to form a unit, and means are provided coupling a group of the guide units at said stations together for simultaneously moving a different element into operative position at each station of said group.

4. Machine according to claim 3, characterized in that the guides of every detector station are mounted on a common pivotable support.

5. Machine according to claim 4, characterized in that the pivotable supports of said group of detector stations are fixedly connected with pinions and said pinions are engaged by a toothed member of a number of mutually coupled tooth members.

6. The machine according to claim 1, wherein each of said detector stations includes at least two detector elements each adapted for adjustment along its transverse path independently of the other, and means for selectively moving each element into operative position at such station.